United States Patent
Bennati

(10) Patent No.: US 11,405,751 B2
(45) Date of Patent: Aug. 2, 2022

(54) METHOD, APPARATUS, AND COMPUTER PROGRAM PRODUCT FOR ANONYMIZING TRAJECTORIES INCLUDING ENDOGENOUS EVENTS

(71) Applicant: HERE GLOBAL B.V., Eindhoven (NL)

(72) Inventor: Stefano Bennati, Zurich (CH)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 17/088,271

(22) Filed: Nov. 3, 2020

(65) Prior Publication Data

US 2022/0141618 A1    May 5, 2022

(51) Int. Cl.
| | |
|---|---|
| *H04W 4/02* | (2018.01) |
| *H04W 12/02* | (2009.01) |
| *H04W 4/029* | (2018.01) |
| *H04W 4/024* | (2018.01) |

(52) U.S. Cl.
CPC .......... *H04W 4/027* (2013.01); *H04W 4/024* (2018.02); *H04W 4/029* (2018.02); *H04W 12/02* (2013.01)

(58) Field of Classification Search
CPC ..... H04W 4/024; H04W 4/027; H04W 4/029; H04W 12/02
USPC ...................................................... 455/456.1
See application file for complete search history.

(56) References Cited

U.S. PATENT DOCUMENTS

| | | |
|---|---|---|
| 9,727,976 B1 * | 8/2017 | Perkins ............... G06K 9/0063 |
| 9,760,718 B2 | 9/2017 | Braghin et al. |
| 10,664,616 B2 | 5/2020 | Herlocker et al. |
| 2013/0261954 A1 | 10/2013 | Boschker et al. |
| 2017/0358204 A1 | 12/2017 | Modica et al. |
| 2018/0268168 A1 | 9/2018 | Herlocker et al. |

OTHER PUBLICATIONS

Li et al., "Two-Stage Privacy-Preserving Mechanism for a Crowdsensing-Based VSN", IEEE Access, vol. 6 (2018), pp. 40682-40695.
Terrovitis et al., "Local Suppression and Splitting Techniques for Privacy Preserving Publication of Trajectories", IEEE Transactinos on Knowledge and Data Engineering, vol. 29 (2017), 14 pages.

(Continued)

*Primary Examiner* — Joel Ajayi
(74) *Attorney, Agent, or Firm* — Alston & Bird LLP

(57) ABSTRACT

Embodiments described herein relate to anonymizing of trajectories of mobile devices through the introduction of gaps between sub-trajectories and accommodating endogenous events. Methods may include: receiving a set of probe data points defining a trajectory; receiving a mode, where the mode is established based on a preceding set of probe data points defining a trajectory, where the mode includes an indication of whether a preceding set of probe data points terminated during a sub-trajectory or a gap, and a time at which the sub-trajectory or the gap of the preceding set of probe data points began; receiving an indication of an event occurring at an event time; determining whether to transmit a sub-trajectory including a sub-set of the set of probe data points based on the mode and the event time; and transmitting the event to a service provider for use in providing location-based services.

20 Claims, 17 Drawing Sheets

(56) References Cited

OTHER PUBLICATIONS

Wang et al., "Utility-Maximizing Event Stream Suppression", SIGMOD '13: Proceedings of the 2013 ACM SIGMOD International Conference on Management of Data (Jun. 2013), pp. 589-600.
Extended European Search Report for European Application No. 21206016.4 dated Mar. 23, 2022, 8 pages.

* cited by examiner

METHOD, APPARATUS, AND COMPUTER PROGRAM PRODUCT FOR ANONYMIZING TRAJECTORIES INCLUDING ENDOGENOUS EVENTS

TECHNOLOGICAL FIELD

An example embodiment of the present disclosure relates to anonymizing trajectories of mobile devices, and more particularly, to segmenting a trajectory and introducing gaps between the trajectory segments based on tailored use cases to anonymize trajectories that include endogenous events.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, to segmenting a trajectory and introducing gaps between the trajectory segments based on tailored use cases to anonymize trajectories that include endogenous events. According to an example embodiment, an apparatus is provided including at least one processor and at least one memory including computer program code, the at least one memory and computer program code configured to, with the processor, cause the apparatus to at least: receive a set of probe data points defining a trajectory; receive a mode, where the mode is established based on a preceding set of probe data points defining a trajectory, where the mode includes an indication of whether a preceding set of probe data points terminated during a sub-trajectory or a gap, and a time at which the sub-trajectory or the gap of the preceding set of probe data points began; receive an indication of an event occurring at an event time; determine whether to transmit a sub-trajectory including a sub-set of the probe data points based on the mode and the event time; and transmit the event to a service provider for use in providing location-based services.

According to some embodiments, the event includes a location and a timestamp. The event may include an indication of an endogenous event after which probe data will not be transmitted. Causing the apparatus to determine whether to transmit a sub-trajectory based on the mode and the event time may include causing the apparatus to: establish a length of time between a start of the sub-trajectory beginning in a preceding set of probe data points and the event; determine if a valid sub-trajectory having a minimum duration can be generated from the sub-trajectory based on a sub-trajectory end time satisfying the minimum duration; and provide for transmission of the sub-trajectory to the service provider in response to the sub-trajectory end time satisfying the minimum duration and occurring before the event time. The apparatus of example embodiments may be caused to: determine the sub-trajectory end time based on a risk of associating the event with the sub-trajectory.

According to some embodiments, causing the apparatus to determine whether to transmit a sub-trajectory based on the mode and the event time includes causing the apparatus to: establish a length of time between a start of the sub-trajectory beginning in a preceding set of probe data points and the event; determine if a valid sub-trajectory having a minimum duration can be generated from the sub-trajectory based on a sub-trajectory end time satisfying the minimum duration; and provide for transmission of the sub-trajectory up to and including the event to the service provider in response to the sub-trajectory end time failing to satisfy the minimum duration and occurring before the event time. Causing the apparatus to determine whether to transmit a sub-trajectory based on the mode and the event time may include causing the apparatus to: determine that the set of probe data points begins with a gap based on the mode; determine if a length of time between a start of the set of probe data points and the event is long enough to include a valid gap satisfying a minimum gap duration and a valid sub-trajectory satisfying a minimum sub-trajectory duration; transmit the event to the service provider and fail to transmit a sub-trajectory in response to the length of time between the start of the set of probe data points and the event being too short to include a valid gap and a valid sub-trajectory; and transmit a sub-trajectory and the event to a service provider in response to the length of time between the start of the set of probe data points and the event being sufficient to include a valid gap and a valid sub-trajectory.

Causing the apparatus to determine whether to transmit a sub-trajectory based on the mode and the event time may, according to some embodiments, include causing the apparatus to: determine an amount of time between a time at which the sub-trajectory or gap of the preceding set of probe data points began and the event time; determine a number of valid sub-trajectories and valid gaps that can be generated in the amount of time; generate the number of valid sub-trajectories; and transmit the valid sub-trajectories with the event to the service provider.

Embodiments provided herein may include a computer program product having at least one non-transitory computer-readable storage medium having computer-executable program code portions stored therein, the computer-executable program code portions including program code instructions configured to: receive a set of probe data points defining a trajectory; receive a mode, where the mode is established based on a preceding set of probe data points defining a trajectory, where the mode includes an indication of whether a preceding set of probe data points terminated during a sub-trajectory or a gap, and a time at which the sub-trajectory or the gap of the preceding set of probe data points began; receive an indication of an event occurring at an event time; determine whether to transmit a sub-trajectory including a sub-set of the set of probe data points based on the mode and the event time; and transmit the event to a service provider for use in providing location-based services. The event may include a location and a time stamp. The event may include an indication of an endogenous event after which probe data will not be transmitted.

According to some embodiments, the program code instructions to determine whether to transmit a sub-trajectory based on the mode and the event time may include program code instructions to: establish a length of time between a start of the sub-trajectory beginning in a preceding set of probe data points and the event; determine if a valid sub-trajectory having a minimum duration can be generated from the sub-trajectory based on a sub-trajectory end time satisfying the minimum duration; and provide for transmission of the sub-trajectory to the service provider in response to the sub-trajectory end time satisfying the minimum duration and occurring before the event time. Embodiments may include program code instructions to determine the sub-trajectory end time based on a risk of associating the event with the sub-trajectory. The program code instructions to determine whether to transmit a sub-trajectory based on the mode and the event time may include program code instructions to: establish a length of time between a start of the sub-trajectory beginning in a preceding set of probe data points and the event; determine if a valid sub-trajectory having a minimum duration can be generated from the sub-trajectory based on a sub-trajectory end time satisfying the minimum duration; and provide for transmission of the sub-trajectory up to and including the event to the service provider in response to the sub-trajectory end time failing to satisfy the minimum duration and occurring before the event time.

According to some embodiments, the program code instructions to determine whether to transmit a sub-trajectory based on the mode and the event time may include program code instructions to: determine that the set of probe data points begins with a gap based on the mode; determine if a length of time between a start of the set of probe data points and the event is long enough to include a valid gap satisfying a minimum gap duration and a valid sub-trajectory satisfying a minimum sub-trajectory duration; transmit the event to the service provider and fail to transmit a sub-trajectory in response to the length of time between the start of the set of probe data points and the event being too short to include a valid gap and a valid sub-trajectory; and transmit a sub-trajectory and the event to the service provider in response to the length of time between the start of the set of probe data points and the event being sufficient to include a valid gap and a valid sub-trajectory. The program code instructions to determine whether to transmit a sub-trajectory based on the mode and the event time may include program code instructions to: determine an amount of time between a time at which the sub-trajectory or the gap of the preceding set of probe data points began and the event time; determine a number of valid sub-trajectories and valid gaps that can be generated in the amount of time; generate the number of valid sub-trajectories; and transmit the valid sub-trajectories with the event to the service provider.

Embodiments of the present disclosure may provide a method including: receiving a set of probe data points defining a trajectory; receiving a mode, where the mode is established based on a preceding set of probe data points defining a trajectory, where the mode includes an indication of whether a preceding set of probe data points terminated during a sub-trajectory or a gap, and a time at which the sub-trajectory or the gap of the preceding set of probe data points began; receiving an indication of an event occurring at an event time; determining whether to transmit a sub-trajectory including a sub-set of the set of probe data points based on the mode and the event time; and transmitting the event to a service provider for use in providing location-based services. The event may include a location and a time stamp. The event may include an indication of an endogenous event after which probe data will not be transmitted.

According to some embodiments, determining whether to transmit a sub-trajectory based on the mode and the event time may include: establishing a length of time between a start of the sub-trajectory beginning in a preceding set of probe data points and the event; determining if a valid sub-trajectory having a minimum duration can be generated from the sub-trajectory based on a sub-trajectory end time satisfying the minimum duration; and providing for transmission of the sub-trajectory to the service provider in response to the sub-trajectory end time satisfying the minimum duration and occurring before the event time.

Embodiments of the present disclosure may provide an apparatus including: means for receiving a set of probe data points defining a trajectory; means for receiving a mode, where the mode is established based on a preceding set of probe data points defining a trajectory, where the mode includes an indication of whether a preceding set of probe data points terminated during a sub-trajectory or a gap, and a time at which the sub-trajectory or the gap of the preceding set of probe data points began; means for receiving an indication of an event occurring at an event time; means for determining whether to transmit a sub-trajectory including a sub-set of the set of probe data points based on the mode and the event time; and means for transmitting the event to a service provider for use in providing location-based services. The event may include a location and a time stamp. The event may include an indication of an endogenous event after which probe data will not be transmitted.

According to some embodiments, the means for determining whether to transmit a sub-trajectory based on the mode and the event time may include: means for establishing a length of time between a start of the sub-trajectory beginning in a preceding set of probe data points and the event; means for determining if a valid sub-trajectory having a minimum duration can be generated from the sub-trajectory based on a sub-trajectory end time satisfying the minimum duration; and means for providing for transmission of the sub-trajectory to the service provider in response to the sub-trajectory end time satisfying the minimum duration and occurring before the event time.

BRIEF DESCRIPTION OF THE DRAWINGS

Figure 1:
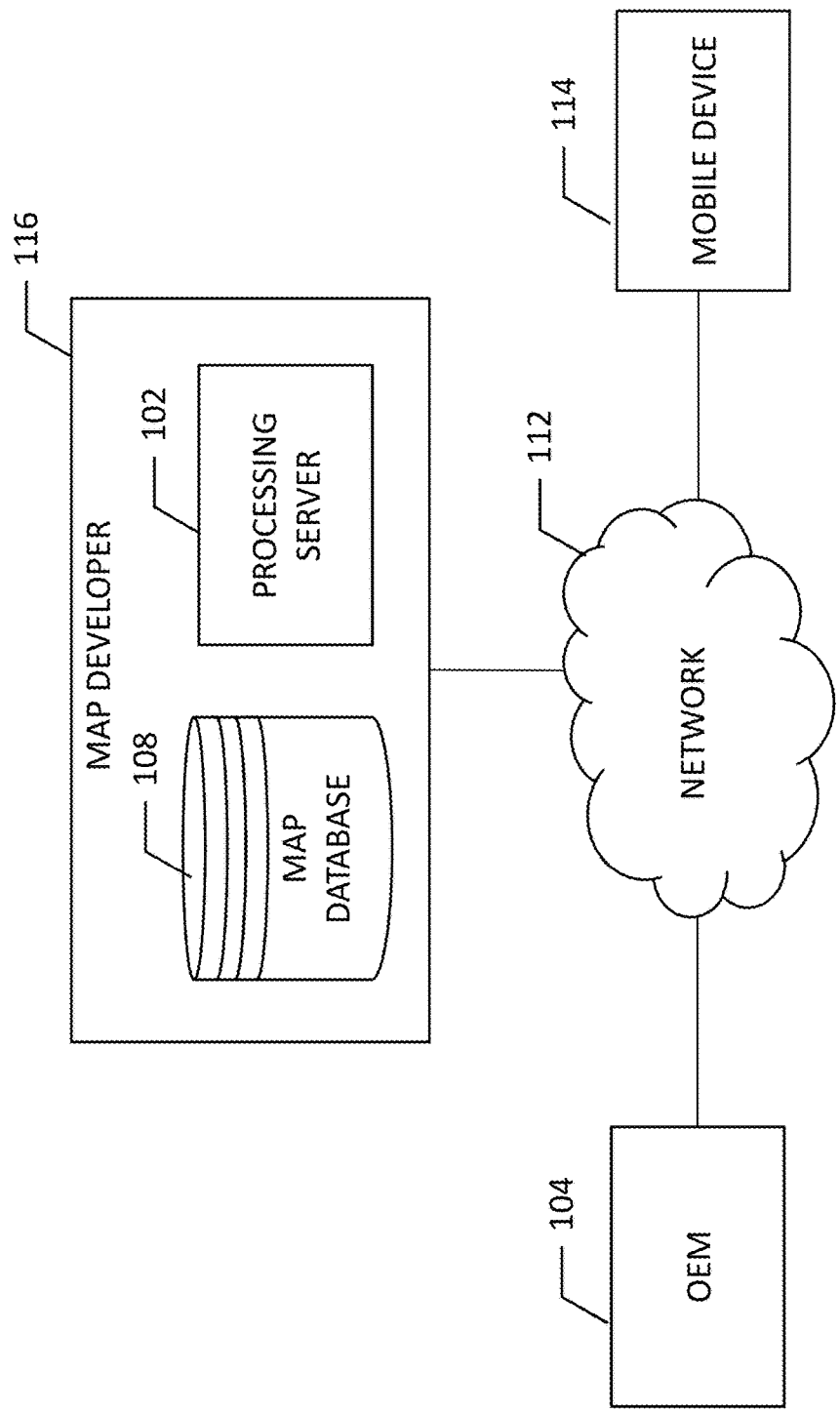
Figure 2:
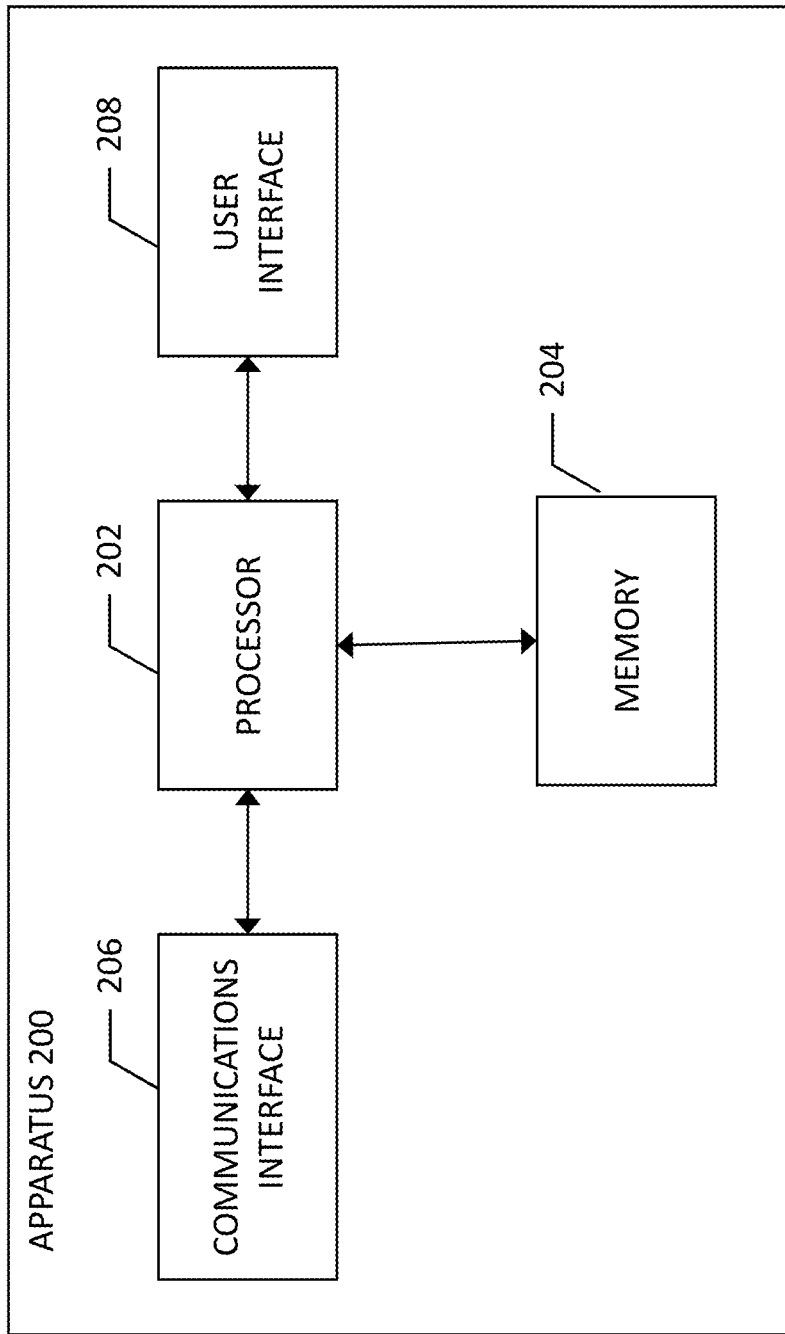
Figure 3:
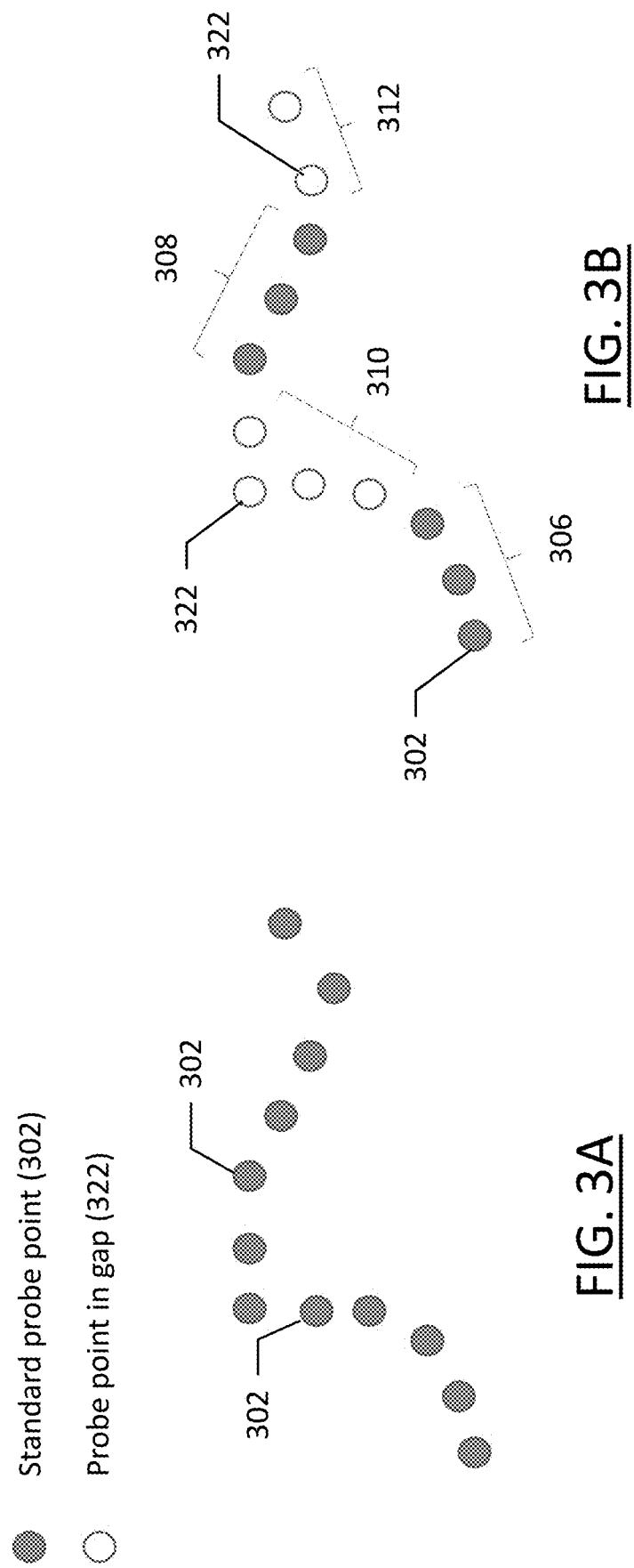
Figure 4:
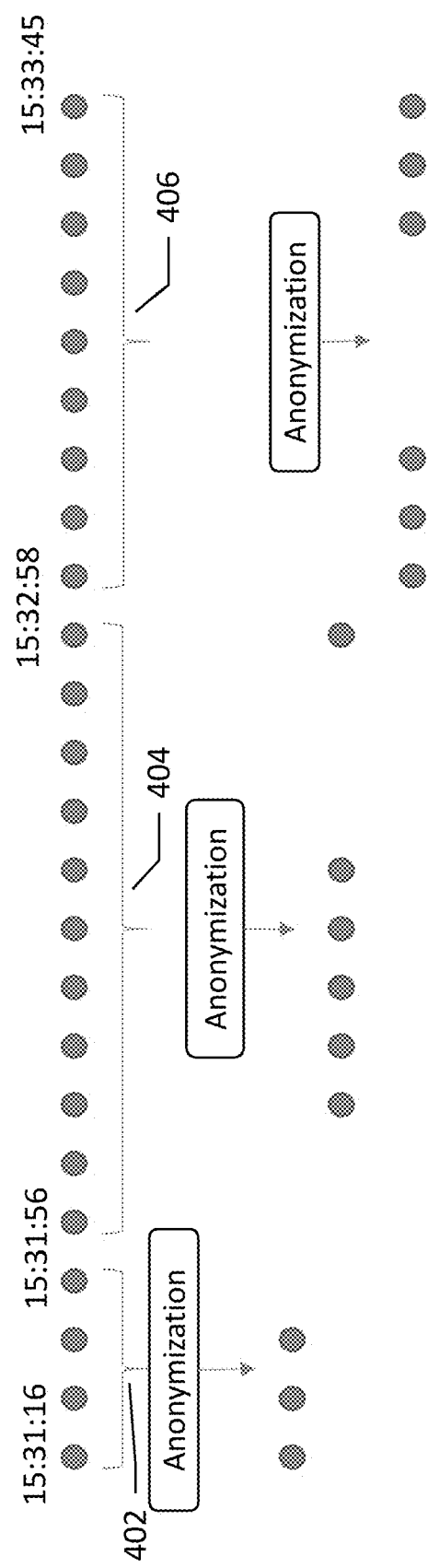
Figure 5A:
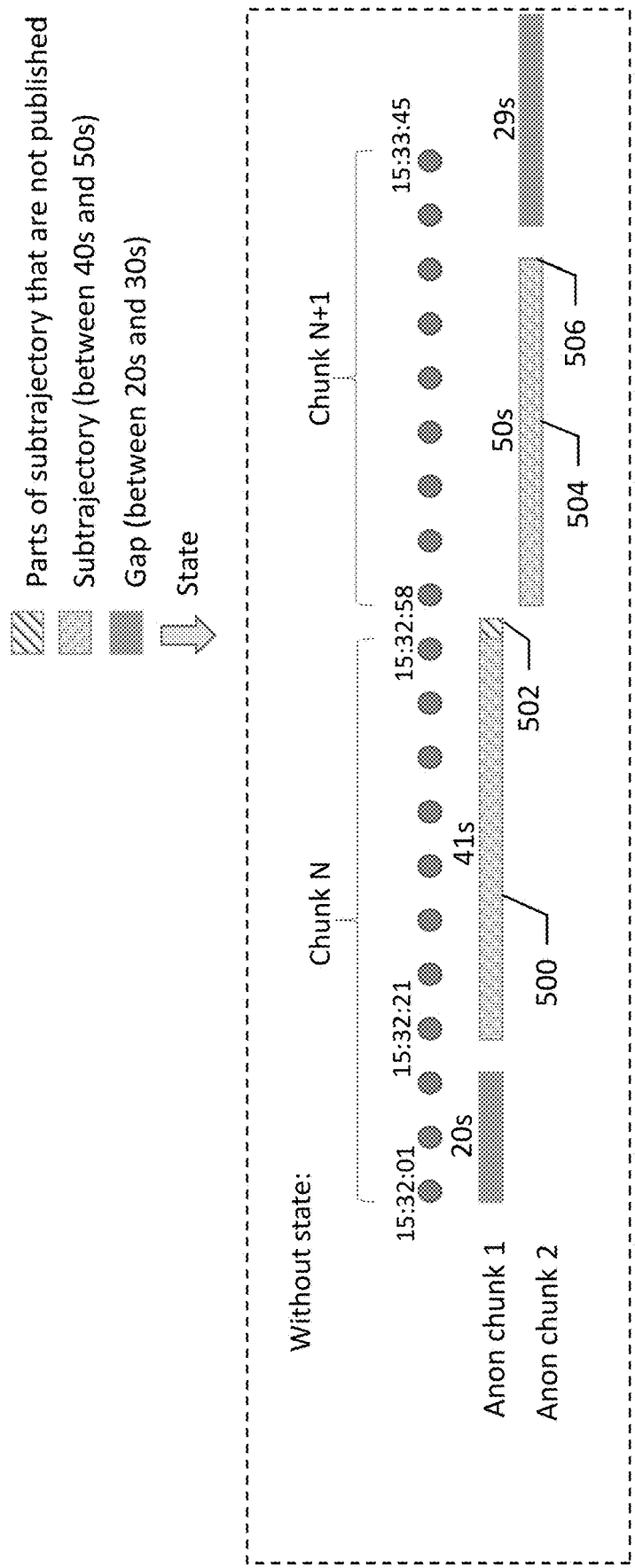
Figure 5B:
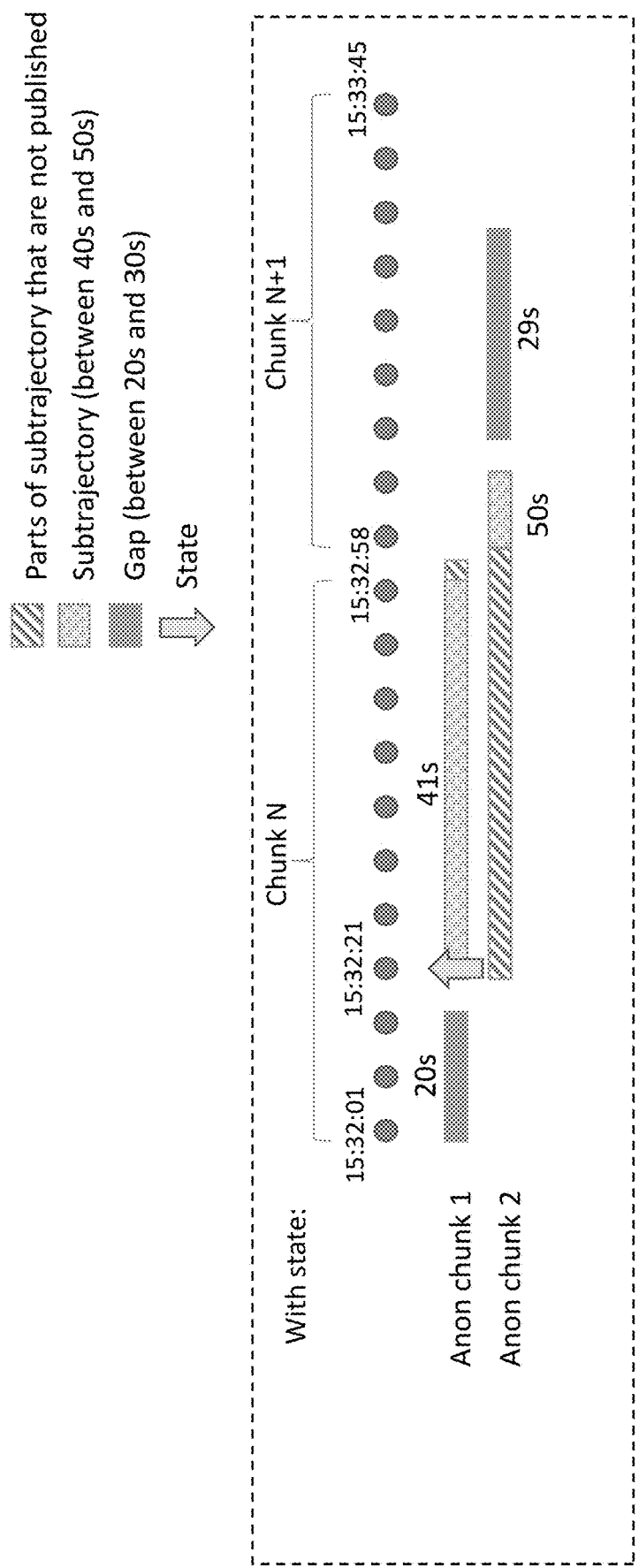
Figure 6A:
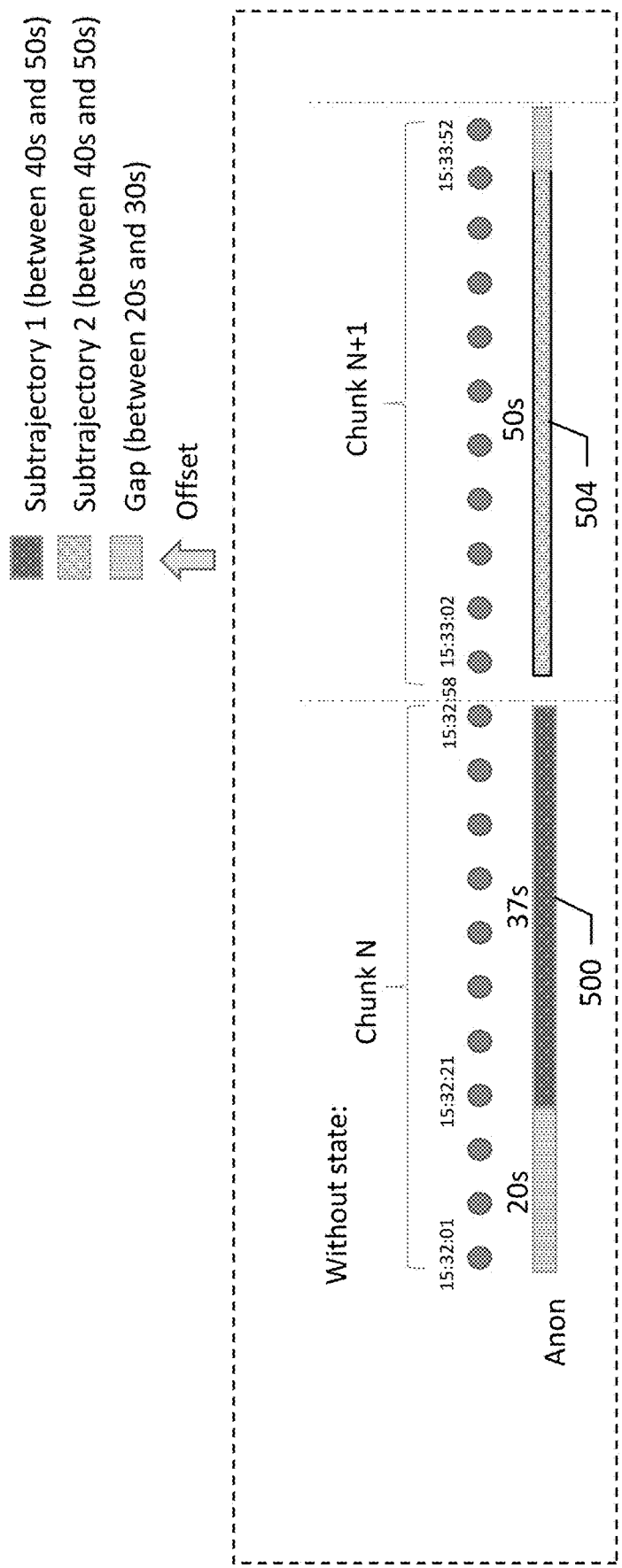
Figure 6B:
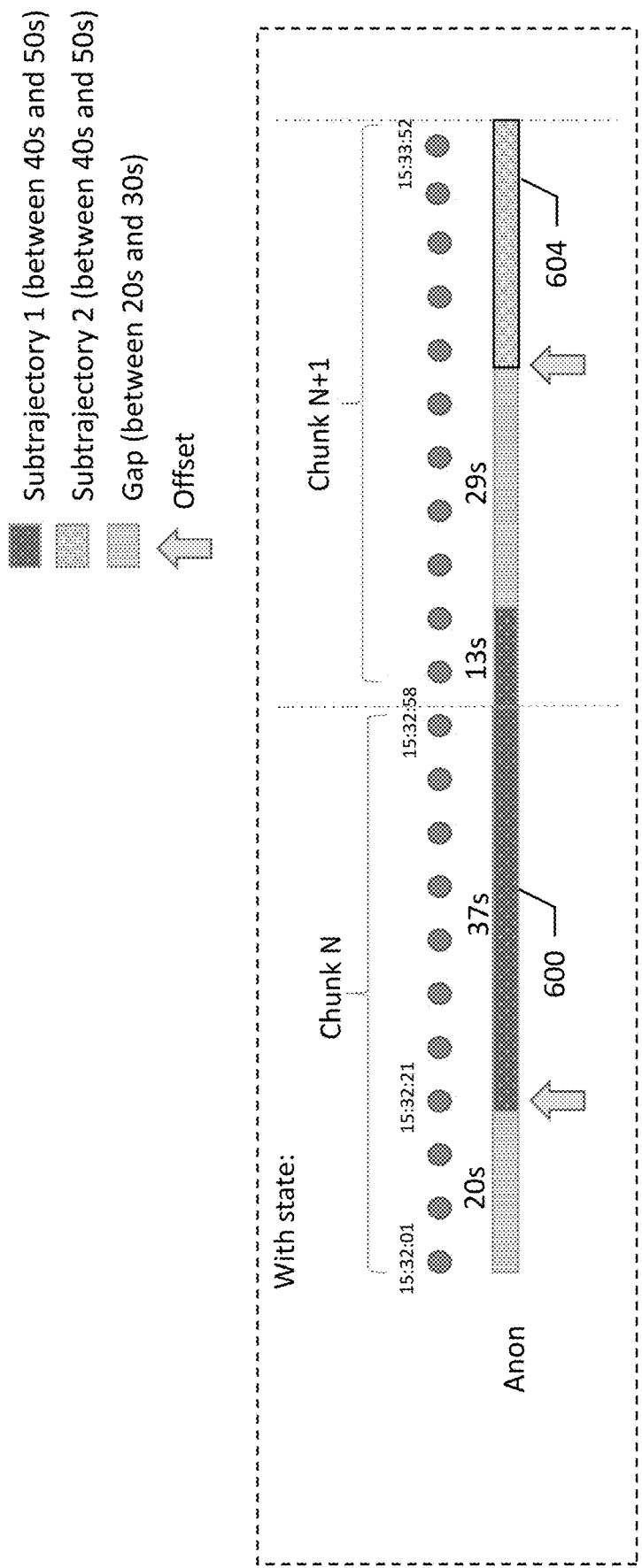
Figure 7:
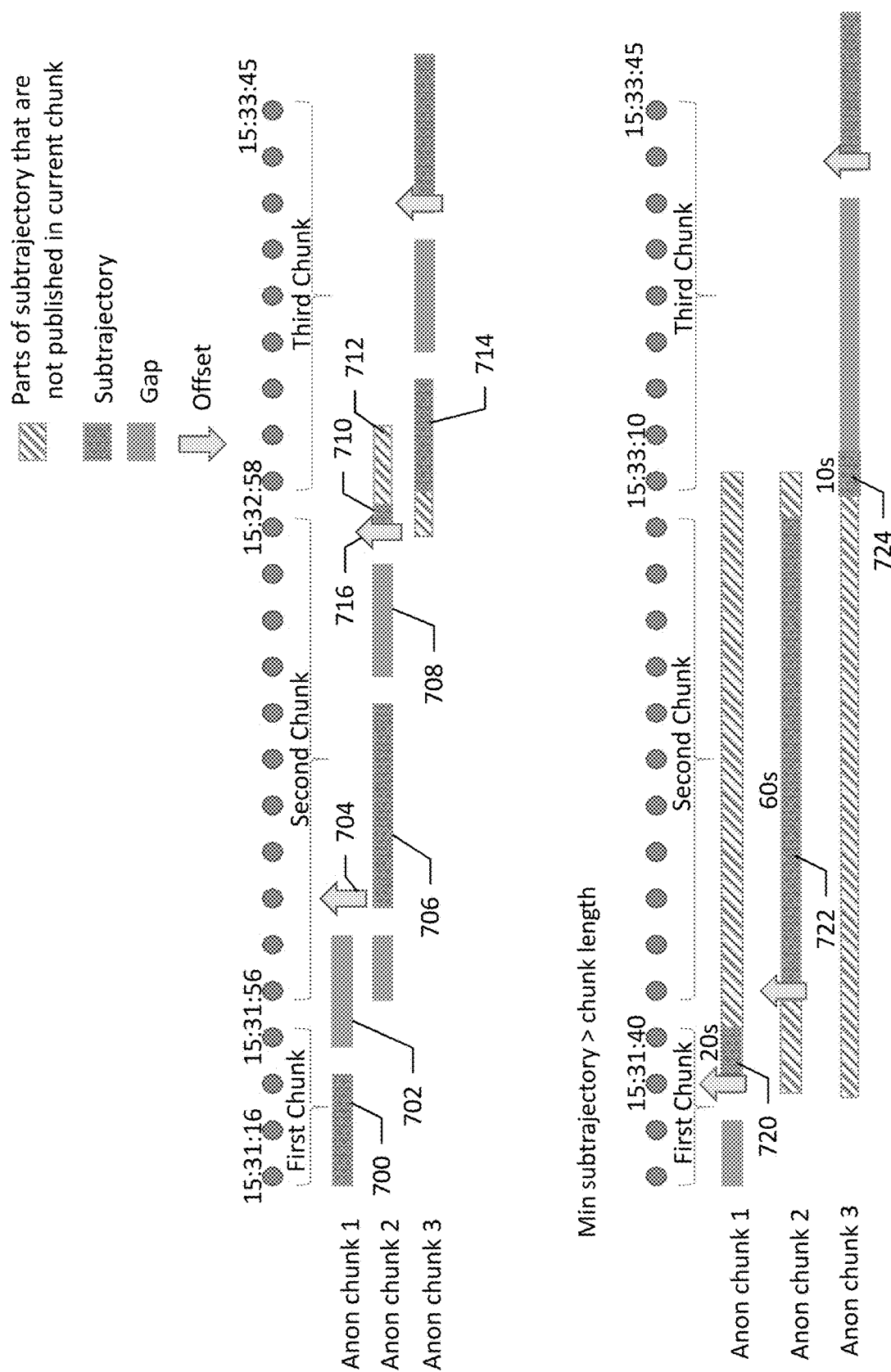
Figure 8:
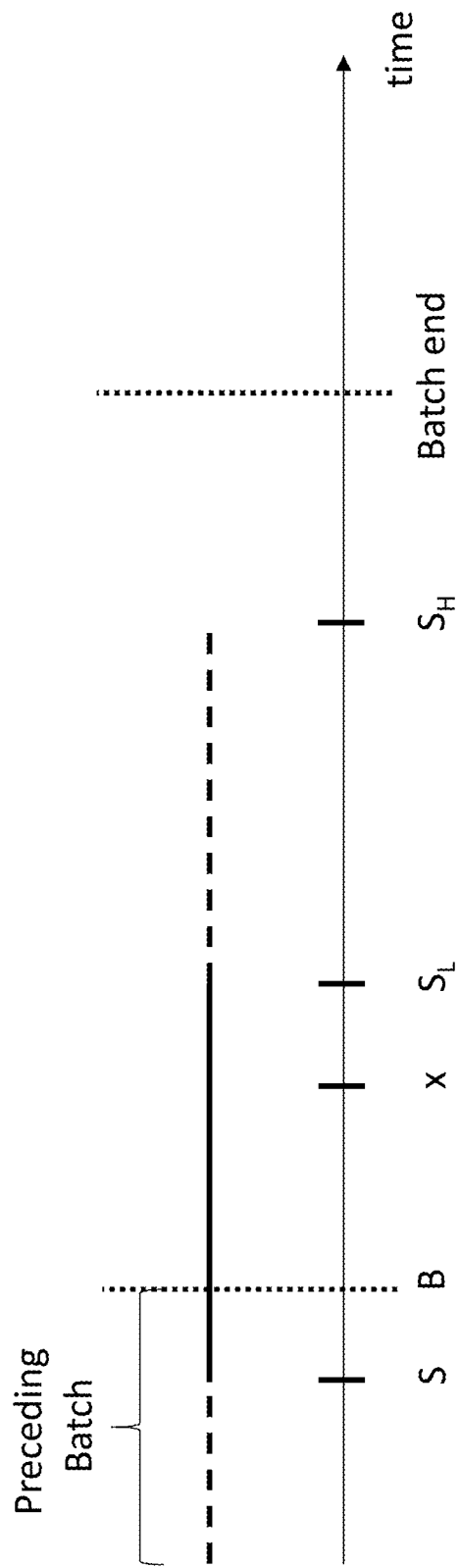
Figure 9:
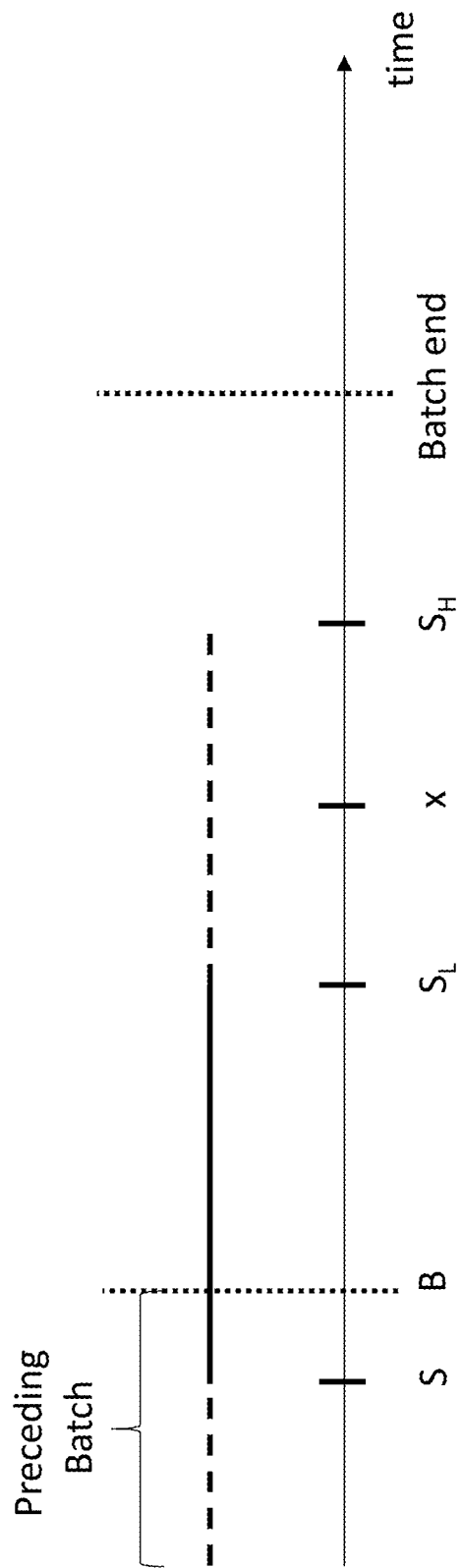
Figure 10:
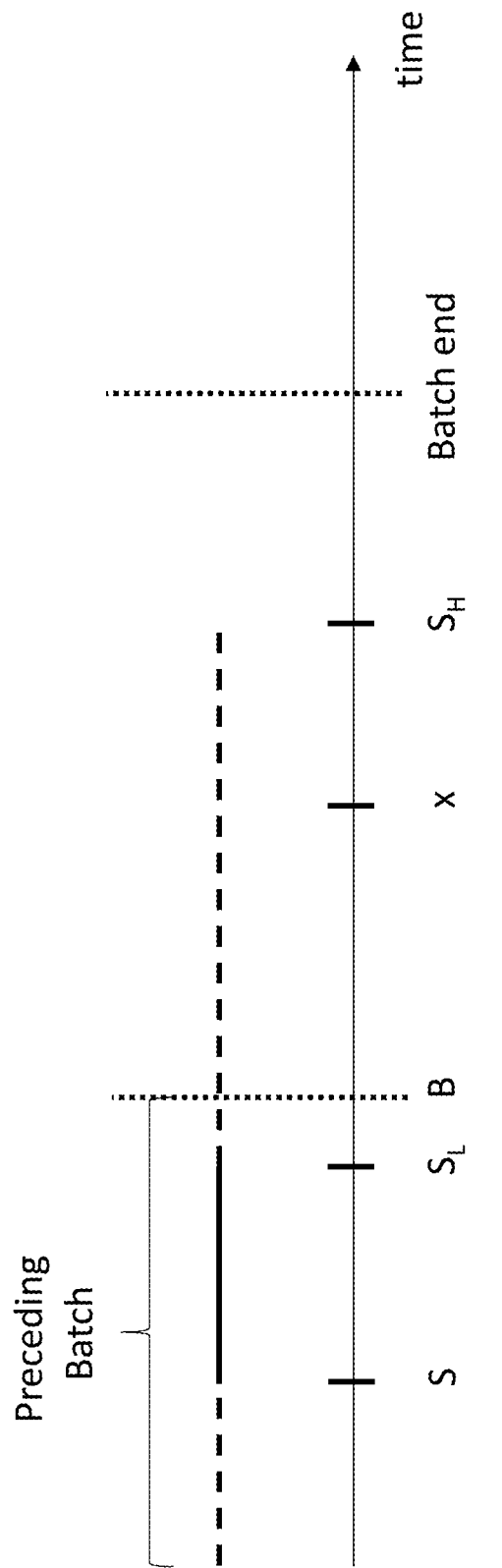
Figure 11:
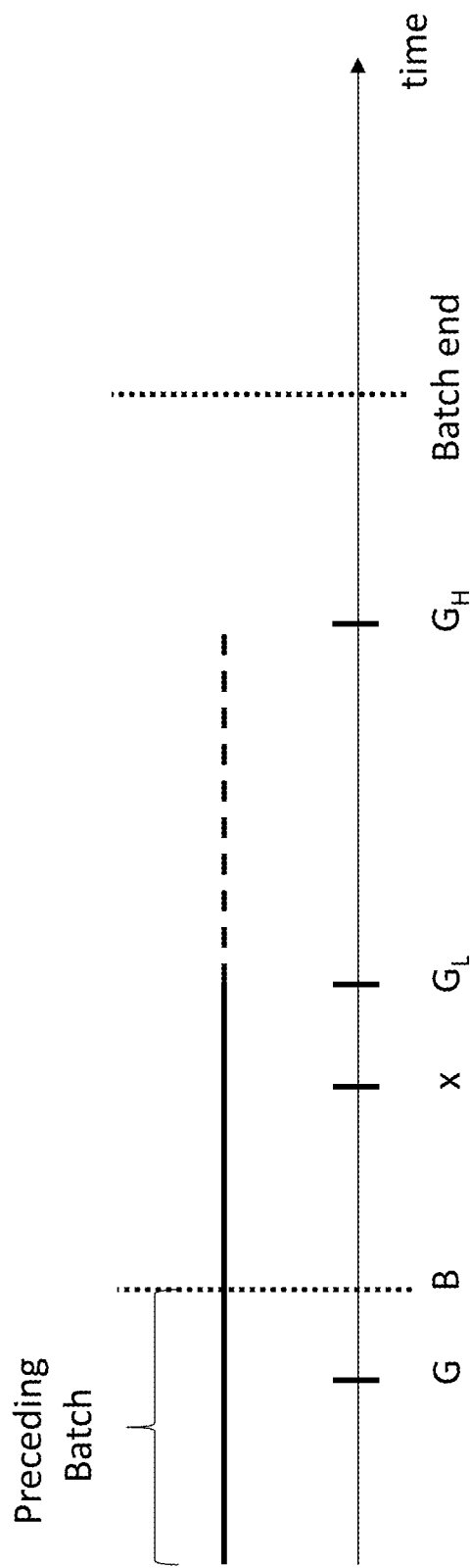
Figure 12:
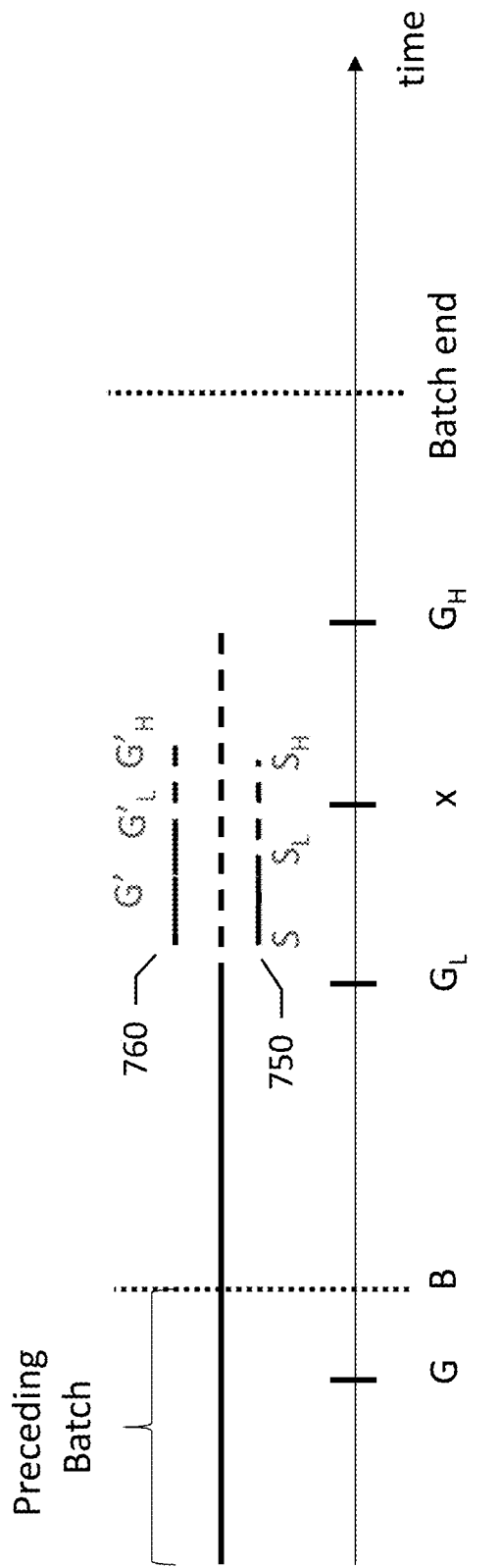
Figure 13:
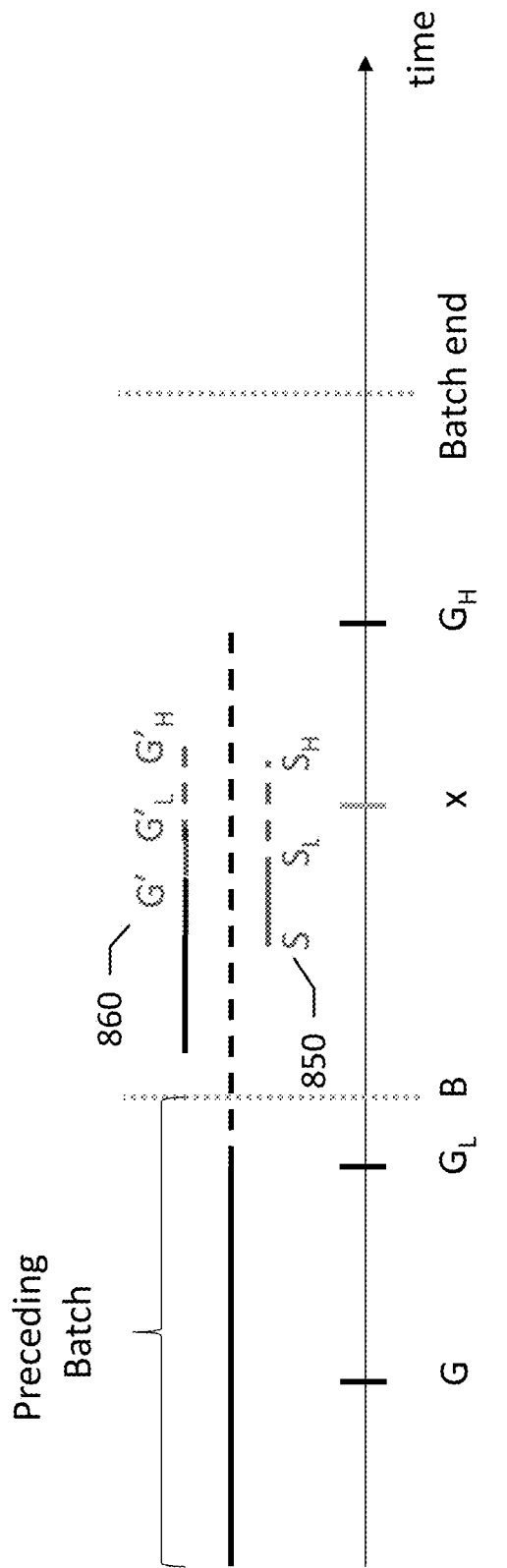
Figure 14:
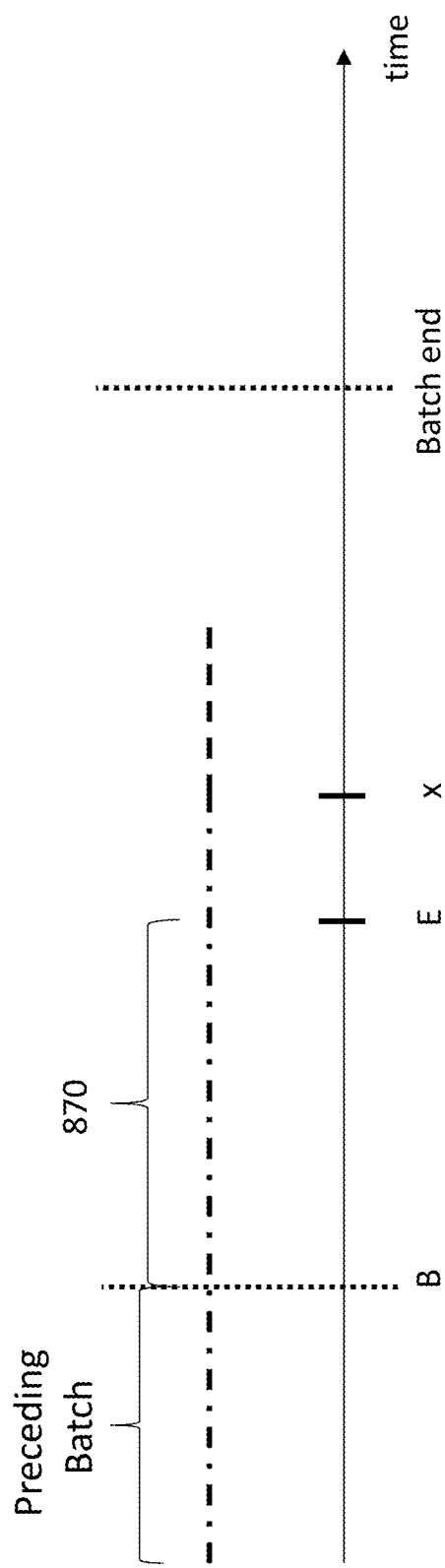
Figure 15:
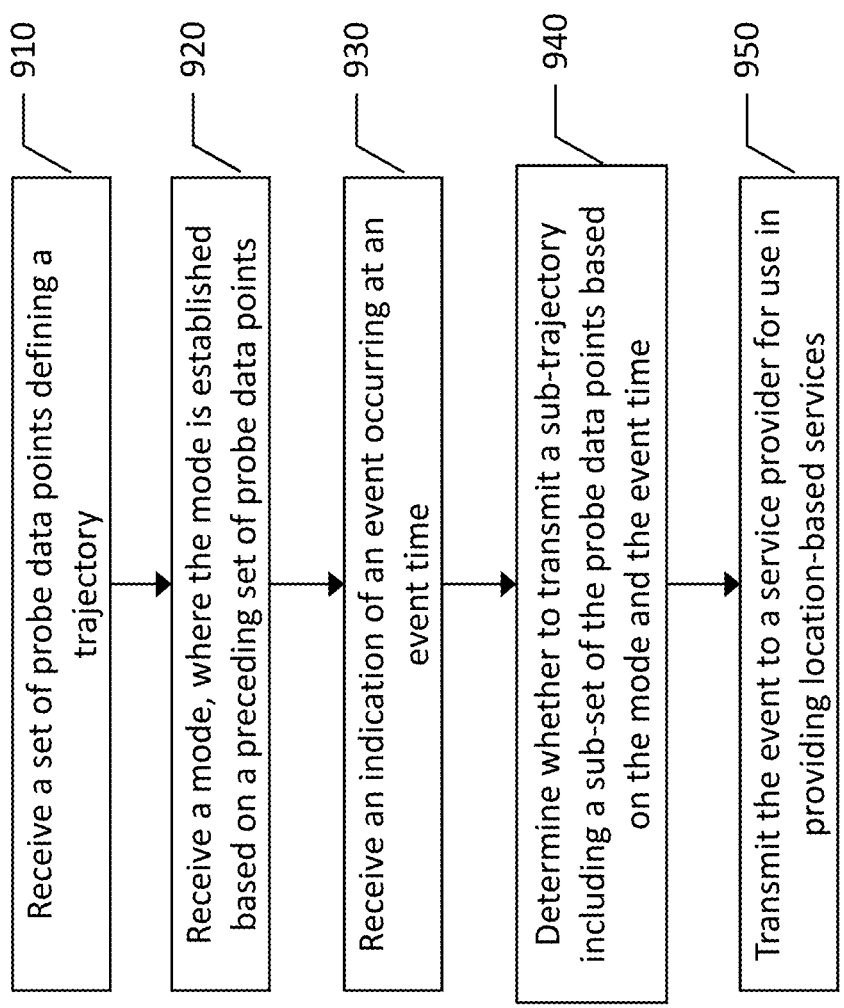

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data in accordance with an example embodiment of the present invention;

FIGS. 3A-3B illustrate a trajectory and two methods of anonymizing the trajectory according to an example embodiment of the present disclosure;

FIG. 4 illustrates an example embodiment in which chunks of probe data are received and anonymized according to an example embodiment of the present disclosure;

FIGS. 5A-5B illustrates the processing of probe data into a sub-trajectory including a sub-trajectory extending between two chunks of probe data according to an example embodiment of the present disclosure;

FIGS. 6A-6B illustrates the processing of probe data into a sub-trajectory including a sub-trajectory extending between two chunks of probe data according to another example embodiment of the present disclosure;

FIG. 7 illustrates the processing of probe data into a sub-trajectory including a sub-trajectory extending between two or more chunks of probe data according to an example embodiment of the present disclosure;

FIG. 8 illustrates a timeline including the start of a sub-trajectory, the beginning of a new batch of probe data points, and an event according to an example embodiment of the present disclosure;

FIG. 9 illustrates another timeline including the start of a sub-trajectory, the beginning of a new batch of probe data points, and an event according to an example embodiment of the present disclosure;

FIG. 10 illustrates another timeline including the start of a sub-trajectory, the beginning of a new batch of probe data points, and an event according to an example embodiment of the present disclosure;

FIG. 11 illustrates a timeline including the start of a gap, the beginning of a new batch of probe data points, and an event according to an example embodiment of the present disclosure;

FIG. 12 illustrates another timeline including the start of a gap, the beginning of a new batch of probe data points, and an event according to an example embodiment of the present disclosure;

FIG. 13 illustrates still another timeline including the start of a gap, the beginning of a new batch of probe data points, and an event according to an example embodiment of the present disclosure;

FIG. 14 illustrates a timeline including the beginning of a new match of probe data and a point in time preceding an event before which sub-trajectory data does not compromise privacy according to an example embodiment of the present disclosure; and FIG. 15 is a flowchart of a method for anonymizing trajectory data to include higher-utility probe data points in sub-trajectories according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories can be partitioned in a set of trajectories (trajectory data), each of which identifies the movement of a user over time. Anonymization of trajectories while providing sufficient information for location based services to be effective requires a balance to be struck between valuable trajectory information including location information of probe data points while also introducing ambiguity for anonymization in the form of gaps between sub-trajectories of a trajectory. These gaps provide distinction between different sub-trajectories and preclude adversaries from identifying a single trajectory belonging to a specific user and preclude the identification of origins and destinations of a complete trajectory.

Anonymization of a trajectory through the splitting and gapping of a trajectory into a plurality of sub-trajectories and gaps faces unique challenges. Anonymization in many cases must be performed in almost-real-time (e.g., anonymized data must be released with a short delay). For this to happen, anonymization algorithms must decide which data points to drop and which ones to keep within a given maximum delay. Anonymizing of location and trajectory data may be performed through application of privacy-enhancing algorithms on the data. Such algorithms may include splitting and gapping of trajectories to subdivide trajectories into a number of shorter sub-trajectories that are pseudonymized and separated by gaps, where data from the original trajectory is dropped. Anonymization may include the placement of these gaps. Selection of these gaps in real-time or near-real-time is challenging. The selection of the gap must be performed as soon as the data point is available for real-time anonymization which means processing each probe data point individually. If the delay is larger (e.g., one-minute or 'near-real-time'), the anonymization can be performed on chunks of data of one-minute lengths. In this case, the anonymized version of the data in a chunk is released as soon as the chunk ends (e.g., every one minute). However, for some use cases, some locations have a higher value or utility than others. Areas where events are frequent or observed, such as major intersections where accident events may occur. Thus, identifying gaps of probe data to drop without concern for location value and utility may result in lower quality data for location based services, and lower customer satisfaction with the location based service they receive.

Further complicating the anonymization of trajectories are unanticipated events, such as endogenous events that may involve a vehicle breaking down, being involved in an accident, or other issue that renders the vehicle non-functional. These endogenous events may be internal properties of a vehicle that may not be perceived by other vehicles or reported by other vehicles. Endogenous events may include a break down signified by emergency flashing lights alone or in combination with another signal (e.g., an open door), a trunk/liftgate/boot of a vehicle open along an expressway, an air-bag deployment event, etc. Endogenous events are relevant for the security of the driver or occupant of a vehicle and take priority over privacy. These events must be reported, such as to a service provider, and false negatives are not acceptable.

A method, apparatus, and computer program product are provided herein in accordance with an example embodiment for anonymizing trajectories of mobile devices, and more particularly, to segmenting a trajectory and introducing gaps between the trajectory segments based on tailored use cases to anonymize trajectories that include endogenous events. Trajectories for a vehicle and/or mobile device can facilitate the use of location-based services for a variety of functions. However, trajectories themselves may provide substantial information regarding an origin, destination, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which location information and more specifically, trajectory information can be gathered and shared in a manner that anonymizes the source of the information and makes unmasking of the source difficult, even when an endogenous event is included in the trajectory. Embodiments provided herein segment and gap a trajectory using an algorithm capable of identifying endogenous events and establishing how to best handle those events when disclosing the trajectory, sub-trajectories, and gaps. Embodiments work within constraints in the length of sub-trajectories or segments and the gaps therebetween provided as two ranges, and determines the actual size of the sub-trajectories and gaps to mitigate the effect of endogenous events on disclosing the identity and sacrificing privacy of a user. Embodiments can anonymize both off-line (e.g., working with full trajectories) and on-line (e.g., working with trajectory chunks). The on-line variant reads the trajectory data in near real-time and anonymizes the trajectory in "chunks" of a given length (e.g., 1 minute). This means that the delay of any probe point, from its reception to the decision of whether to disclose it or not, will always be at most the chunk size (plus any delay due to processing and transmission). Embodiments thereby render it difficult to establish to whom the trajectory belongs while obtaining useful location-based trajectory information for use with location-based services.

To provide an improved manner of anonymizing trajectories, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for anonymizing trajectories of mobile devices, and more particularly, to segmenting a trajectory and introducing gaps between the trajectory segments or sub-trajectories based on tailored use cases to retain portions of the trajectory that have higher utility. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 may derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein provide privacy to users of location-based services by adding uncertainty regarding the trajectory from origin to destination of the user. An origin, destination, separately or as a pair, and even portions of a trajectory not including the origin or destination, can reveal sensitive locations regarding the user that generated the trajectory data, such as a home location and/or a work location, a path there between, route preferences, tendencies, or the like. Further, identification of an origin, a destination, or both, may render the identity of the individual user relatively easy to obtain.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by segmenting a trajectory and introducing gaps between the trajectory segments or sub-trajectories based on tailored use cases to retain portions of the trajectory in order to introduce uncertainty about the actual origin and destination of the trajectory while maintaining the usefulness of the trajectory information for location based services. Algorithms that segment and gap a trajectory into a plurality of sub-trajectories and gaps may encounter endogenous events that are problematic as such events can compromise the anonymity introduced by the splitting and gapping of the trajectory. Embodiments described herein anonymize trajectories of mobile devices, and more particularly, to segmenting a trajectory into sub-trajectories and introduce gaps between the sub-trajectories based on tailored use cases to anonymize trajectories that include endogenous events.

Mobile devices including those carried by users, those associated with vehicles, and any other device type that will track location, produce and transmit sensor data that reflects what was observed during a trip. Sensor data may be transmitted as a sequence of probe points, where the probe points contain sensor observations related to a specific location in space and time. These mobile devices may also observe events (e.g., semantic objects with information about a specific condition such as rain, presence of a road sign, and vehicle malfunction) during a trip. For events to be used in location-based service solutions, the events need to be matched (approximately, within a time window and/or spatial tolerance) to a specific probe data point.

FIG. 3A illustrates a trajectory including probe data points 302. FIG. 3B illustrates anonymization of the trajectory of FIG. 3A where the trajectory is segmented and gapped, whereby first sub-segment 306 and second sub-segment 308 are identified by an algorithm, and first gap 310 and second gap 312 are also identified by the algorithm.

According to an example embodiment, a near real-time scenario may be used where a location-based service has a requirement relating to the freshness of data, where data may need to be processed within e.g. two minutes of its generation. In this scenario, the OEM 104 decides to anonymize the trajectory data represented by a plurality of probe data points in chunks of length chunk length seconds (e.g., two minutes minus delta, where delta is the processing time required by the anonymization algorithm and any other overhead). Each stream of data (probe data points forming a trajectory) from a vehicle or mobile device 114 is split into chunks of certain size chunk length for anonymization. The data may be collected into a buffer, which has a capacity of chunk length seconds. Once the buffer is full, the data contained in the buffer is provided to the anonymization algorithm and the buffer is emptied ready to receive the next chunk of probe data points. FIG. 4 illustrates an example embodiment in which chunks 402, 404, and 406 are received and anonymized.

The chunks of example embodiments can be synchronized where chunks of different trajectories from different vehicles and mobile devices start and end simultaneously, such as at the beginning of each minute or every other minute. Chunks could be asynchronous and based on time, where each chunk starts at multiples of the chunk length away from the first probe data point in the trajectory. Chunks can be asynchronous and based on probes, where each chunk starts at the first probe data point after the end of the previous chunk, independent of the distance between this probe point and the last probe point in the previous chunk.

Synchronizing chunks of probe data points can increase privacy as an eavesdropper or adversary could use differences in the times at which anonymized chunks are transmitted (e.g., from one backend to another) to link together sub-trajectories in the anonymized data. For example, if the chunk length is one minute, and one trajectory starts at 00:00:12 with no other trajectory starting at XX:XX:12, the eavesdropper could infer that all chunks starting at XX:XX:12 (excluding those that start with a gap as the first probe data point will be delayed) belong to the same trajectory.

Once the anonymized data for a chunk is published, the anonymization of this data cannot be changed. This constrains the agency of the anonymization algorithm in the current chunk only. The anonymization algorithm can use the information about the current chunk to decide where to place sub-trajectories and gaps. In such a scenario, it may be important to keep track of the state of the trajectory in the previous chunk, which should constrain the mode (e.g., gap or sub-trajectory), the offset (e.g. the time when the mode started), and the last sub-trajectory identified that has been used. The state thus identifies whether the prior chunk ended during a gap or a sub-trajectory, and identifies when that gap or sub-trajectory started. Without this state information, it would not be possible to satisfy the conditions about sub-trajectory and gap sizes.

The state is useful to keep constraints regarding length of the sub-trajectories and gaps across chunks. For example, as shown in FIGS. 5A and 5B, where sub-trajectories are established to be between 40 seconds and 50 seconds long and gaps between 20 seconds and 30 seconds long. A sub-trajectory 500 that starts at second 21 will not finish within one chunk (the chunk has length of 60 seconds and the sub trajectory must have at least 40 seconds of length, so the Chunk N ends 37 seconds into the sub-trajectory 500 and the sub-trajectory ends at 61 seconds, beyond the end of Chunk N shown at 502 in FIG. 5A. With state not considered, the anonymization of the next chunk, Chunk N+1 of FIG. 5A, might determine a sub-trajectory 504 that starts at zero seconds in the next chunk, and ends at 50 seconds 506. Therefore, two sub-trajectories 500 and 504 will not be separated by a gap, leading to releasing consecutive probe data points for a total length of 37 second plus 50 seconds, or 87 seconds.

The absence of a gap between two sub-trajectories renders it easier for the two sub-trajectories to be associated with one another. Keeping an offset, or the time where the mode or last gap/sub-trajectory started, enables determination of the correct length of the sub-trajectory in the second chunk as 50 seconds (the desired length) minus 37 seconds (the current length) to equal 13 seconds as shown in FIG. 5B. Keeping also the sub-trajectory identifier enables assignment of the points in the second chunk the same identifier as the points in the first chunk, hence leading to a sub-trajectory of length 50 seconds versus two trajectories of 37 seconds and 13 seconds, respectively. FIGS. 6A and 6B illustrate the resultant sub-trajectories both with and without the use of the state identifying the mode (gap or sub-trajectory), the offset (the time when the respective mode started), and the last sub-trajectory identifier used. As shown, without the use of state shown in FIG. 6A, sub-trajectories 500 and 504 exist and are substantially adjacent using consecutive probe data points. While sub-trajectories 600 and 604 shown in FIG. 6B, despite being broken over two chunks (Chunk N and Chunk N+1), satisfy sub-trajectory length requirements and gap requirements while avoiding adjacent sub-segments.

The value in the offset could identify a probe point before or after the beginning of the chunk. A positive value (e.g., a point after the beginning of the chunk) means that the last chunk ended with a gap, such that the first sub-trajectory of the current chunk should start with a delay equal to the extent of the gap in the current chunk. A negative value (e.g., a point before the beginning of the chunk) means that the last chunk ended with a sub-trajectory, such that the first sub-trajectory in the current chunk should be shortened by an amount equal to the extent of the sub-trajectory in the last chunk to have the last sub-trajectory satisfy the sub-trajectory length requirement. Optionally, the offset may always be negative, identifying a point in the preceding chunk that is the start of either a gap or a sub-trajectory. The state is then used to establish whether the preceding chunk ended with a gap or a sub-trajectory.

FIG. 7 illustrates embodiments described herein where a first chunk includes a sub-trajectory 700 and a gap 702. The first chunk ends during the gap, so the offset 704 is in the following chunk. At the offset, 704, the next sub-trajectory 706 begins and extends its duration while remaining within the second chunk. A next gap 708 follows the sub-trajectory 706 and a next sub-trajectory 710 begins within the second chunk. This sub-trajectory 710 extends beyond the second chunk, such that portion 712 of the sub-trajectory is not captured in the second chunk. Conversely, using the offset of example embodiments described herein, the sub-trajectory 710 is continued into the third chunk as sub-trajectory 714 based on the offset 716 in the second chunk.

FIG. 7 also illustrates an example embodiment of an implementation of the present disclosure with respect to minimum sub-trajectory lengths that are longer than the probe data chunk length. In the illustrated embodiment, the minimum sub-trajectory length is 90 seconds, while the chunk lengths are 60 seconds. As shown, a first sub-trajectory portion 720 of 20 seconds is within a first chunk, while a second sub-trajectory portion 722 of 60 seconds is in a second chunk, and the third sub-trajectory portion 724 of 10 seconds is found in the third chunk. Embodiments described herein using the offset to establish that the second chunk and the third chunk begin with sub-trajectories continuing from prior chunks, and as the state includes the sub-trajectory identifier, the three sub-trajectory portions 720, 722, and 724, can be combined as a complete sub-trajectory of 90 seconds.

Example embodiments provided herein include an algorithm for anonymizing trajectories of mobile devices, and more particularly, to segmenting a trajectory and introducing gaps between the trajectory segments or sub-trajectories based on tailored use cases to anonymize trajectories that include endogenous events. As input to the anonymization algorithm, trajectory data is received that includes a set of probe data points $R=[p_1 \ldots, p_n]$ and a trajectory identifier associated with the probe data points. A probe data point $p_i$ includes at least location (e.g., latitude and longitude) along with a timestamp.

The gap constraints of the algorithm $P_G=(g_{min}, g_{max})$ and sub-trajectory constraints $P_S=(s_{min}, s_{max})$ are used to determine the minimum and maximum lengths of the gaps and of the sub-trajectories, respectively. The gap constraint ($g_{min}$) is the minimum length of a gap, ($g_{max}$) is the maximum length of a gap, ($s_{min}$) is the minimum length of a sub-trajectory, and ($s_{max}$) is the maximum length of a sub-trajectory. Input constraints $C_S$ and $C_e$ corresponding to a chunk start and a chunk end timestamp indicate whether the vehicle or mobile device can send a full trajectory or send chunks of the trajectory in sequence. In the first case where the full trajectory may be sent, $C_S$ and $C_e$ identify the time at which the trajectory starts and ends, respectively. In the second case where chunks of the trajectory are sent, $C_S$ and $C_e$ identify the time at which the current chunk of the trajectory starts and ends, respectively. In the case of sending chunks of the trajectory, multiple chunks will have the same (approximately) size chunk length. The mode, which may be optional, determines if the algorithm should produce a gap or a sub-trajectory, with the default value being sub-trajectory. The mode identifies whether the prior chunk ended with a gap or a sub-trajectory. Optionally, a sub-trajectory identifier pseudo_trajectory_ID may be provided indicating the sub-trajectory identifier of the most recent sub-trajectory of the probe data. If this identifier is not provided, a new random identifier is generated. Optionally, an offset O is used by the algorithm that identifies the time where the mode (e.g., the last gap or sub-trajectory) started. This defaults to the time of the first probe point on the input.

The sub-trajectory constraints and gap constraints may be used to improve the flexibility with which sub-trajectories are established. Providing a temporal length range for the sub-trajectories and the gaps enables sub-trajectories to be established to capture higher-utility probe data points and to handle endogenous events within a trajectory. The anonymization algorithm of example embodiments outputs one or more anonymized trajectories $A=[p_i, p_{i+1}, \ldots, p_{i+j}]$ where $1<=i<i+j<=n$ which contain a subset of the points in R. The anonymized data contains a sequence of alternating sub-trajectories and gaps, which include consecutive probe data points. The anonymization algorithm determines the set of anonymized sub-trajectories based on the constraints $P_G$ and $P_S$ and the values associated to probe points $p_i$: the value of points in the sub-trajectory is added to the chunk, while points contained in the gap do not increase the value.

According to an example embodiment described herein, a helper function is defined to return index of the optimal end of the current mode (either sub-trajectory or gap):

find_optimal_end_of_state (min_expected_time, max_expected_time, mode):

1. Find a point $L_1$ that corresponds to min_expected_time.
2. Find a point $L_2$ that corresponds to max_expected_time.
   $L_1$ and $L_2$ can be found either as closest (in time) to min_expected_time/max_expected_time, or as first candidates to satisfy conditions on sub-trajectory (gap) sizes (if strict condition on sub-trajectory (gap) size is required).
3. u_max=the sum of utilities of all points in range ($L_1$; $L_2$].
4. If u_max>0
   If mode="sub-trajectory"→return the index of the last element in the trajectory that is before $L_2$ and has U>0.
   If mode="gap"→return index of the first probe after $L_1$ that has U>0
5. If u_max=0→return random the index from the interval between points $L_1$ and $L_2$ The anonymization algorithm may be defined as:

Read:
  mode, whether to produce a sub-trajectory or a gap. If the state is not provided, default to 'sub-trajectory'.
  O: the time where the mode, i.e. the last gap or sub-trajectory started. If the state is not provided, set it to the time of $p_1$
  pseudo_trajectory_id: the ID of the last-created sub-trajectory. If the state is not provided, set it to a random ID
Set:
  progress=1: the index of the probe point in R up to where the anonymization of the data has got and where to continue anonymizing it.
  $p_s=1$
While progress <n:

1. Calculate timestamp that corresponds to min required sub-trajectory (gap) length:
   min_expected_time = O + s_min (min_expected_time = O + g_min)
2. Calculate timestamp that corresponds to max required sub-trajectory (gap) length:
   max_expected_time = O + s_max (max_expected_time = O + g_max)
3. If *max_expected time* > $C_E$
       If *mode* = 'sub-trajectory' # delay decision to next chunk
           progress = n + 1
       else # keep the shortest gap possible, unless it ends in the next chunk
           progress = min(*min_expected_time*, n+1)
   else:
       If *min_expected_time* < $C_S$ (meaning that in the previous chunk the decision was delayed):
           Beginning = $p_1$.timestamp
       Else:
           Beginning = min_expected_time
       progress = *find_optimal_end_of_state (beginning, max_expected_time, mode)*

-continued

```
4. if mode='sub-trajectory' -
     if O in [C_s, C_e]:
        generate new pseudo_trajectory_id
        publish sub-trajectory [p_s; ...; p_{min(n,progress)}] with pseudo_trajectory_id
5. if progress <= n: ##Update state
     p_s=p_progress, O=p_s.timestamp
     invert mode
return: mode, O, pseudo_trajectory_id
```

Anonymizing trajectories that lack any anomalies described above allows location-based services to provide valuable services to users while anonymizing the trajectories of those users. However, anomalies such as endogenous events that prematurely end a trajectory introduce a complexity that is handled by embodiments described herein to maximize privacy while still providing trajectory information for location-based services. Endogenous events are generally internal to a vehicle such that they cannot be reported by other vehicles. For this reason, it is important to report such endogenous events, particularly as these events might endanger other drivers and there is no redundancy in reporting.

A vehicle may 'observe' an endogenous event, such as when the vehicle breaks down and is forced to stop, introducing a danger on the road. Endogenous events should be reported in real time to minimize risks for other drivers. Embodiments described herein assume that events are reported in real time, while trajectory data is reported following a predefined cycle as described above The algorithms of example embodiments would not be as efficient in anonymizing personal information or in timely reporting endogenous events if the trajectory data and the event data are reported at the same time. Reporting events at the predefined time (e.g., at the end of a chunk) results in delayed event reporting which may introduce safety risks. Reporting trajectory data when the event happens (e.g., transmitting trajectory data outside of the batch cycle) introduces privacy risks as the trajectory data and the event data can be more easily associated.

As described above, anonymization determines the size of gaps and sub-trajectories based on some provided constraints including the range of possible sizes (lengths) of the gaps and sub-trajectories. The choice of sizes determines the location of sub-trajectories and gaps, hence what data is kept and what data is dropped from the anonymized data. A decision function may be used to determine the size of the gaps and trajectories and it may be performed by random sampling or by a more intelligent algorithm.

Embodiments described herein presume there is a risk function that, given an event and a sub-trajectory, can compute the privacy risk of associating the event with the sub-trajectory. Generally speaking, the closer the event to the sub-trajectory, the easier it is to associate them (e.g., by doing interference in the movement of the vehicle after the end of the sub-trajectory). Embodiments described herein ensure that safety-critical events are reliably and timely reported, while at the same time producing anonymized data. Real-time algorithms where each point is processed individually are not suitable for use in reporting endogenous events as described herein as the decision of whether to start a gap must be taken only on the information about the current probe point and those that preceded that point. Almost near real-time processing (e.g., with chunks of about one minute) may provide agency on where to place gaps within a short period of time (e.g., the length of the chunk), such that the decision is not about whether to release one point, but which among a set of points to release. This enables the creation of gaps that increase utility while obeying the constraints on the size of gaps and sub-trajectories.

Endogenous events should generally be transmitted outside of the batch or chunk cycle as they are time-critical. Endogenous events render the vehicle sending the endogenous events unusable for a certain amount of time. The vehicle does not send any more valuable data after the event, and the data transmission from the vehicle may be interrupted after the event (e.g., until the vehicle is repaired or otherwise returned to service). Endogenous events may include various types of malfunctions (electrical and/or mechanical) that preclude typical operation. Further, endogenous events may include events that leave the vehicle still drivable, but it may be unsafe to do so. For example, if a vehicle is rear-ended, the occupants may experience whiplash, but the vehicle may remain capable of driving. Further, endogenous events may provide forewarning to a user with alerts and warnings (e.g., engine or battery overheating) that can be acknowledged by a user. Other endogenous events may include events from which a vehicle is readily recoverable. For example, a vehicle may experience a software malfunction that requires a re-start, or a vehicle may stall. Such recoverable events may still be treated as endogenous events where a re-start may not be assured. The batch or chunk in which the endogenous event occurs is treated as the 'last batch' and is treated differently with respect to previous batches.

Preferably, the event would be processed separately from the rest of the data in the batch, where the event reported in real time while the rest of the data transmitted at a later time point according to the normal batch schedule. If this is not possible, reporting data collected before the event and the event synchronously would render the event easily associated with the trajectory and compromise anonymity. Embodiments described herein provide an anonymization algorithm that has logic to decide the length of gaps and sub-trajectories within the bounding parameters. Whenever an endogenous event is not present, the size of the gaps and sub-trajectories are determined by this logic. Embodiments provide a function to estimate the privacy risk related to transmitting the event together with some additional trajectory data (e.g., the risk of re-associating the event with a sub-trajectory).

The goal of example embodiments described herein is to transmit the event as mandatory. Trajectory data should also be transmitted to provide utility for other use cases (e.g., for location-based services). Embodiments minimize the risk that the event is re-identified and associated with a sub-trajectory. Embodiments regulate the trade-off between the utility, from transmitting more trajectory data, and the privacy, from the risk of re-identifying the event.

The algorithm of example embodiments determines, for every batch, if an endogenous event occurs. If an endogenous event does not occur, gap and sub-trajectory sizes are defined using the algorithm described above. However, if an endogenous event does occur, the logic of example embodiments described herein defines gaps and sub-trajectories uses the aforementioned logic until one of the situations detailed below corresponds with the current state of anonymization, the state of the previous batch/chunk, the position of the event, and the constraints on the sub-trajectory and gap sizes. The privacy risk logic is used to compute the risk of associating the event with alternative recommendations. If the recommendation requires determination of a sub-trajectory or gap size (e.g., find a point to start a gap after the start of a sub-trajectory but before the event), the privacy risk is computed of associating the sub-trajectory that ends at the gap start with the event. The actual length of the sub-trajectory selected would be determined by picking a point with the best trade-off between utility and privacy.

For algorithms described herein, parameters are defined as follows. As defined above, the gap constraints include $P_G=(g_{min}, g_{max})$ and the sub-trajectory constraints include $P_S=(s_{min}, s_{max})$, as described above, with the gap constraint ($g_{min}$) being the minimum length of a gap, ($g_{max}$) being the maximum length of a gap, ($s_{min}$) being the minimum length of a sub-trajectory, and ($s_{max}$) being the maximum length of a sub-trajectory. The following parameters are each points in time:

x: the time at which the event happens/starts
B: the time at which the current batch begins
S: the time at which the current subtrj begins
$S_L$: the time at which the shortest valid subtrj begins ($S+s_{min}$)
$S_H$: the time at which the longest valid subtrj ends ($S+s_{max}$)
G: the time at which the current gap begins
$G_L$: the time at which the shortest valid gap begins ($G+g_{min}$)
$G_H$: the time at which the longest valid gap ends ($G+g_{max}$)

Various scenarios of example embodiments provided herein are now described with respect to the timelines of FIGS. 8 through 14 for reporting endogenous events while also providing useful trajectory information while maintaining anonymity. FIG. 8 illustrates a timeline including the start time of a sub-trajectory (S) that begins in a preceding batch of data that has already been transmitted and anonymized. The mode at the start of the current batch (B) includes an indication of a sub-trajectory (and including the sub-trajectory identifier) along with an offset of the time (S) when the sub-trajectory started. The endogenous event (x) occurs before the time of the shortest valid sub-trajectory ($S_L$). As the previous batch ended with an incomplete sub-trajectory, the sub-trajectory must continue into the current batch. The event occurs at a time (x) before a valid sub-trajectory can be completed, such that a valid sub-trajectory cannot be transmitted. Dropping or discarding the data for the sub-trajectory is also not useful as the sub-trajectory began in the preceding batch, such that an adversary would see an incomplete sub-trajectory and associate it with the event. As the sub-trajectory will be associated with the event anyway, all data until the time of the endogenous event (x) is transmitted in order to maximize utility.

FIG. 9 illustrates a timeline including the start time of a sub-trajectory (S) that begins in a preceding batch of data that has already been transmitted and anonymized. The mode at the start of the current batch (B) includes an indication of a sub-trajectory including the sub-trajectory identifier along with an offset of the time (S) when the sub-trajectory started. The endogenous event (x) occurs after a minimum time for a valid sub-trajectory ($S_L$) but before the maximum time for a valid sub-trajectory ($S_H$). In this scenario, a valid sub-trajectory can be established between (S) and an arbitrary point (G) identified between ($S_L$) and (x) such that (G: $S_L<=G<x$). The position of G is selected based on the risk of associating the event at (x) with any sub-trajectory. The closer the sub-trajectory ends with respect to the event, the easier it is to associate the event with the sub-trajectory. The utility/privacy trade-off is computed to any valid point (G) and the sub-trajectory ends at the position (G) having the best trade-off.

FIG. 10 illustrates a timeline including the start time of a sub-trajectory (S) that begins in a preceding batch of data that has already been transmitted and anonymized. The mode at the start of the current batch (B) includes an indication of a sub-trajectory including the sub-trajectory identifier along with an offset of the time (S) when the sub-trajectory started. The previous batch ended with a valid sub-trajectory length as point (B) came after ($S_L$). In this scenario, the sub-trajectory can continue to be transmitted after point (B) until an arbitrary point (G), where (G: $B<=G<x$). Optionally, the sub-trajectory can be interrupted at point (B) since the sub-trajectory would remain valid for being within the allowable duration for a sub-trajectory. The placement of point (G) where a gap would begin may be determined based on the risk of associating the event at (x) with any sub-trajectory. The closer the trajectory data is to an event, the easier it is to associate the event with the trajectory data. If the privacy/utility trade-off associated with transmitting the sub-trajectory is too bad, the sub-trajectory data may be dropped altogether and not sent to the OEM. A valid sub-trajectory could finish at ($S_L$) or at (B), and a gap could begin provided the event (x) is not close to the end of a maximum gap length ($G_H$) at which point a new sub-trajectory would generally begin.

FIG. 11 illustrates a timeline including the start time of a gap (G) that begins in a preceding batch of data that has already been transmitted and anonymized. The mode at the start of the current batch (B) includes an indication of a gap and an offset identifying the start time of the gap such that a minimum gap length ($G_L$) and a maximum gap length ($G_H$) can be established. In the illustrated scenario, an endogenous event (x) occurs before the minimum gap length ($G_L$). In this scenario, the event can be transmitted and no additional data is sent as the event occurred outside of a sub-trajectory. Thus, the sub-trajectories generated by the vehicle appear as normal and the risk of any of those previously generated sub-trajectories with the event at (x) is low.

FIG. 12 illustrates a timeline including the start time of a gap (G) that begins in a preceding batch of data that has already been transmitted and anonymized. The mode at the start of the current batch (B) includes an indication of a gap and an offset identifying the start time of the gap such that a minimum gap length ($G_L$) and a maximum gap length ($G_H$) can be established. In this scenario, an endogenous event occurs at (x) between the minimum gap length ($G_L$) and the maximum gap length ($G_H$). In this embodiment, the event may be sent and no other information provided to the OEM, as with the embodiment of FIG. 11. Optionally, depending upon the time of occurrent of the event (x), an additional sub-trajectory may be if event (x) is at a time where a valid sub-trajectory could be sent (e.g., satisfying at least the minimum sub-trajectory length ($S_L$) shown at 750. If the time between the minimum gap length ($G_L$) and the event (x) is larger than the distance between a new sub-trajectory start (S) and the maximum duration of that sub-trajectory ($S_H$), a new gap beginning at point (G') is introduced provided the event (x) falls between the minimum gap length ($G'_L$) and the maximum gap length ($G'_H$) as shown at 760. This enables the most data to be sent to the OEM for use by a location-based service provider without compromising the anonymity of the vehicle with the endogenous event.

FIG. 13 illustrates a timeline including the start time of a gap (G) that begins in a preceding batch of data that has already been transmitted and anonymized. The mode at the start of the current batch (B) includes an indication of a gap and an offset identifying the start time of the gap (G) such that a minimum gap length ($G_L$) and a maximum gap length ($G_H$) can be established. In this scenario, an endogenous event occurs at (x) between the minimum gap length ($G_L$) and the maximum gap length ($G_H$). In this embodiment, the minimum gap length ($G_L$) occurs before the current batch starts (B) such that the gap would already count as valid if ended at (B). The event (x) may be sent without any additional data in this batch. Optionally, another sub-trajectory 850 may be sent before the event if there is sufficient time between batch start (B) and the event (x) to complete a valid sub-trajectory. If the distance between the start of the batch (B) or the maximum gap length ($G_H$) and the event (x) is longer than the maximum time for a valid sub-trajectory, a sub-trajectory may be sent with a new gap starting at (G') shown at 860 provided the event (x) occurs between the minimum gap length ($G'_L$) and the maximum gap length ($G'_H$). In an embodiment such as that of FIG. 13, based on the start time of the last gap (G) or sub-trajectory in the preceding batch, a time is established between that start time and the event (x). The total amount of time can be analyzed to establish how many valid sub-trajectories and gaps can be generated within that total time, while still providing the event outside of a sub-trajectory. The time between the start of the current batch (B) and the event (x) can then be parsed accordingly.

FIG. 14 illustrates an example embodiment in which the preceding batch has been anonymized and transmitted, and an event (x) is established in the current batch. In this example, the time between the beginning of the current batch (B) and the time of the event (x) is sufficient that there can be multiple valid sub-trajectories and gaps. A point (E) is established and determined as the point beyond which a sub-trajectory ending would pose too high of a risk to be acceptable as a sub-trajectory ending past point (E) may be readily associated with the event (x). Sub-trajectories ending before the position of point (E) define an acceptable risk where the sub-trajectories can be transmitted without incurring too high of a privacy risk. The position of point (E) can be found using the privacy risk function. Once point (E) is found, standard logic can be used to define gaps and sub-trajectories for all points between (B) and (E). The last sub-trajectory might end at point (E) or at any point before point (E). The event (x) and any sub-trajectory data before point (E) can be transmitted to the service provider.

FIG. 15 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 15 illustrates a method of anonymizing trajectories of mobile devices, and more particularly, to segmenting a trajectory and introducing gaps between the trajectory segments based on tailored use cases to anonymize trajectories that include endogenous events. In the illustrated embodiment, a set of probe data points defining a trajectory is received at 910. The set of probe data points may be received, for example, by an OEM 104 from a vehicle or mobile device 114. The probe data points may include a location (e.g., latitude and longitude), a time stamp, and an indication of the utility of the probe data point which may include an indication of the observations at the probe data point, for example. A mode is received where the mode is established based on a preceding set of probe data points as shown at 920. The mode may identify whether the preceding set of probe data points ended on a sub-trajectory or a gap, a time or offset from when the last gap or sub-trajectory started (e.g., from a gap or trajectory on which the preceding set of probe data points ended), and an identifier of a sub-trajectory when the preceding set of probe data points ended on a sub-trajectory. At 930, an indication is received identifying an event occurring at an event time. The event includes an endogenous event where the event represents the end of the probe data transmission from the vehicle or mobile device. At 940, it is determined whether to transmit a sub-trajectory including a sub-set of the probe data points based on the mode and the event time. The event is then transmitted to a service provider for use in providing location-based services at 950.

In an example embodiment, an apparatus for performing the method of FIG. 15 above may comprise a processor (e.g., the processor 202) configured to perform some or each of the operations (910-950) described above. The processor may, for example, be configured to perform the operations (910-950) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 910-950 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    receive a set of probe data points defining a trajectory;
    receive a mode and an offset, wherein the mode is established based on a preceding set of probe data points defining a trajectory, wherein the mode is a binary indication defining for one value that the preceding set of probe data points terminated during a sub-trajectory and for another value that the preceding set of probe data points terminated during a gap, and the offset is a time at which the sub-trajectory or the gap during which the preceding set of probe data points terminated began;
    receive an indication of an event occurring at an event time;
    determine a privacy risk of transmitting another sub-trajectory comprising a sub-set of the set of probe data points based on the mode, the offset, and the event time;
    transmit the another sub-trajectory comprising the sub-set of the probe data points based on the mode, the offset, and the event time in response to the privacy risk satisfying a predetermined condition; and
    transmit the event to a service provider for use in providing location-based services.

2. The apparatus of claim 1, wherein the event comprises a location and a time stamp.

3. The apparatus of claim 2, wherein the event comprises an indication of an endogenous event after which probe data will not be transmitted.

4. The apparatus of claim 1, wherein causing the apparatus to determine the privacy risk of transmitting the another sub-trajectory based on the mode, the offset, and the event time comprises causing the apparatus to:
    establish a length of time between a start of the another sub-trajectory beginning in a preceding set of probe data points and the event;
    determine if a valid sub-trajectory having a minimum duration can be generated from the another sub-trajectory based on a sub-trajectory end time satisfying the minimum duration; and
    determine that the privacy risk satisfies the predetermined condition in response to the sub-trajectory end time satisfying the minimum duration and occurring before the event time.

5. The apparatus of claim 4, wherein the apparatus is further caused to:
    determine the sub-trajectory end time based on a risk of associating the event with the sub-trajectory.

6. The apparatus of claim 1, wherein causing the apparatus to determine the privacy risk of transmitting the another sub-trajectory based on the mode, the offset, and the event time comprises causing the apparatus to:
    establish a length of time between a start of the another sub-trajectory beginning in the preceding set of probe data points and the event;
    determine if a valid sub-trajectory having a minimum duration can be generated from the another sub-trajectory based on a sub-trajectory end time satisfying the minimum duration; and
    provide for transmission of the another sub-trajectory up to and including the event to the service provider in response to the sub-trajectory end time failing to satisfy the minimum duration and occurring before the event time.

7. The apparatus of claim 1, wherein causing the apparatus to determine the privacy risk of transmitting the another sub-trajectory based on the mode, the offset, and the event time comprises causing the apparatus to:
    determine that the set of probe data points begins with a gap based on the mode;
    determine if a length of time between a start of the set of probe data points and the event is long enough to include a valid gap satisfying a minimum gap duration and a valid sub-trajectory satisfying a minimum sub-trajectory duration;
    transmit the event to the service provider and fail to transmit a sub-trajectory in response to the length of time between the start of the set of probe data points and the event being too short to include a valid gap and a valid sub-trajectory; and
    transmit a further sub-trajectory and the event to a service provider in response to the length of time between the start of the set of probe data points and the event being sufficient to include a valid gap and a valid sub-trajectory.

8. The apparatus of claim 1, wherein causing the apparatus to determine the privacy risk of transmitting the another sub-trajectory based on the mode, the offset, and the event time comprises causing the apparatus to:
    determine an amount of time between a time at which the sub-trajectory or the gap of the preceding set of probe data points began and the event time;
    determine a number of valid sub-trajectories and valid gaps that can be generated in the amount of time;
    generate the number of valid sub-trajectories; and
    transmit the valid sub-trajectories with the event to the service provider.

9. A computer program product comprising at least one non-transitory computer-readable storage medium having computer-executable program code portions stored therein, the computer-executable program code portions comprising program code instructions configured to:

receive a set of probe data points defining a trajectory;
receive a mode and an offset, wherein the mode is established based on a preceding set of probe data points defining a trajectory, wherein the mode is a binary indication defining for one value that the preceding set of probe data points terminated during a sub-trajectory and for another value that the preceding set of probe data points terminated during a gap, and the offset is a time at which the sub-trajectory or the gap during which the preceding set of probe data points terminated began;
receive an indication of an event occurring at an event time;
determine a privacy risk of transmitting another sub-trajectory comprising a sub-set of the set of probe data points based on the mode, the offset, and the event time;
transmit the another sub-trajectory comprising the sub-set of the probe data points based on the mode, the offset, and the event time in response to the privacy risk satisfying a predetermined condition; and
transmit the event to a service provider for use in providing location-based services.

10. The computer program product of claim 9, wherein the event comprises a location and a time stamp.

11. The computer program product of claim 10, wherein the event comprises an indication of an endogenous event after which probe data will not be transmitted.

12. The computer program product of claim 9, wherein the program code instructions to determine the privacy risk of transmitting the another sub-trajectory based on the mode, the offset, and the event time comprise program code instructions to:
establish a length of time between a start of the another sub-trajectory beginning in a preceding set of probe data points and the event;
determine if a valid sub-trajectory having a minimum duration can be generated from the another sub-trajectory based on a sub-trajectory end time satisfying the minimum duration; and
determine that the privacy risk satisfies the predetermined condition in response to the sub-trajectory end time satisfying the minimum duration and occurring before the event time.

13. The computer program product of claim 12, further comprising program code instructions to:
determine the sub-trajectory end time based on a risk of associating the event with the sub-trajectory.

14. The computer program product of claim 9, wherein the program code instructions to determine the privacy risk of transmitting the another sub-trajectory based on the mode, the offset, and the event time comprise program code instructions to:
establish a length of time between a start of the another sub-trajectory beginning in the preceding set of probe data points and the event;
determine if a valid sub-trajectory having a minimum duration can be generated from the another sub-trajectory based on a sub-trajectory end time satisfying the minimum duration; and
provide for transmission of the another sub-trajectory up to and including the event to the service provider in response to the sub-trajectory end time failing to satisfy the minimum duration and occurring before the event time.

15. The computer program product of claim 9, wherein the program code instructions to determine the privacy risk of transmitting the another sub-trajectory based on the mode, the offset, and the event time comprise program code instructions to:
determine that the set of probe data points begins with a gap based on the mode;
determine if a length of time between a start of the set of probe data points and the event is long enough to include a valid gap satisfying a minimum gap duration and a valid sub-trajectory satisfying a minimum sub-trajectory duration;
transmit the event to the service provider and fail to transmit a sub-trajectory in response to the length of time between the start of the set of probe data points and the event being too short to include a valid gap and a valid sub-trajectory; and
transmit a further sub-trajectory and the event to a service provider in response to the length of time between the start of the set of probe data points and the event being sufficient to include a valid gap and a valid sub-trajectory.

16. The computer program product of claim 9, wherein the program code instructions to determine the privacy risk of transmitting the another sub-trajectory based on the mode, the offset, and the event time comprise program code instructions to:
determine an amount of time between a time at which the sub-trajectory or the gap of the preceding set of probe data points began and the event time;
determine a number of valid sub-trajectories and valid gaps that can be generated in the amount of time;
generate the number of valid sub-trajectories; and
transmit the valid sub-trajectories with the event to the service provider.

17. A method comprising:
receiving a set of probe data points defining a trajectory;
receiving a mode and an offset, wherein the mode is established based on a preceding set of probe data points defining a trajectory, wherein the mode is a binary indication defining for one value that the a preceding set of probe data points terminated during a sub-trajectory and for another value that the preceding set of probe data points terminated during a gap, and the offset is a time at which the sub-trajectory or the gap during which the preceding set of probe data points terminated began;
receiving an indication of an event occurring at an event time;
determining a privacy risk of transmitting another sub-trajectory comprising a sub-set of the set of probe data points based on the mode, the offset, and the event time;
transmitting the another sub-trajectory comprising the sub-set of the probe data points based on the mode, the offset, and the event time in response to the privacy risk satisfying a predetermined condition; and
transmitting the event to a service provider for use in providing location-based services.

18. The method of claim 17, wherein the event comprises a location and a time stamp.

19. The method of claim 18, wherein the event comprises an indication of an endogenous event after which probe data will not be transmitted.

20. The method of claim 17, wherein determining the privacy risk of transmitting the another sub-trajectory based on the mode and the event time comprises:
establishing a length of time between a start of the another sub-trajectory beginning in a preceding set of probe data points and the event;

determining if a valid sub-trajectory having a minimum duration can be generated from the another sub-trajectory based on a sub-trajectory end time satisfying the minimum duration; and determining that the privacy risk satisfies the predetermined condition in response to the sub-trajectory end time satisfying the minimum duration and occurring before the event time.

* * * * *